United States Patent
Wasinger et al.

(10) Patent No.: US 6,799,933 B1
(45) Date of Patent: Oct. 5, 2004

(54) FREIGHT LOAD PALLET CARRIER AND METHOD FOR DISTRIBUTING FREIGHT LOAD PALLETS

(76) Inventors: Carl Wasinger, 12610 Overbrook Rd., Leawood, KS (US) 66209; Tony Wasinger, 92 Forest Oak Ct., Winona, MN (US) 55987

( * ) Notice: Subject to any disclaimer, the term of this patent is extended or adjusted under 35 U.S.C. 154(b) by 0 days.

(21) Appl. No.: 10/226,661

(22) Filed: Aug. 23, 2002

(51) Int. Cl.$^7$ .............................................. B65G 67/00
(52) U.S. Cl. ..................... 414/352; 414/395; 414/509; 414/514; 414/521; 414/529; 414/557
(58) Field of Search ................................ 414/352, 395, 414/400, 468, 509, 514, 520, 521, 529, 536, 557; 105/373, 355

(56) References Cited

U.S. PATENT DOCUMENTS

| | | | | |
|---|---|---|---|---|
| 262,454 A | * | 8/1882 | McManus | 105/373 |
| 664,145 A | * | 12/1900 | Gunkle | 105/373 |
| 2,121,181 A | * | 6/1938 | Bayerl | 414/395 |
| 2,601,170 A | * | 6/1952 | Retzlaff | 414/557 |
| 4,543,027 A | * | 9/1985 | Jones | 414/400 |
| 5,054,987 A | * | 10/1991 | Thornton | 414/400 |
| 5,395,204 A | * | 3/1995 | Balik | 414/521 |
| 6,056,497 A | * | 5/2000 | Holz | 414/514 |

* cited by examiner

Primary Examiner—Joseph Valenza
(74) Attorney, Agent, or Firm—Sonnenschein Nath & Rosenthal LLP; Brian R. McGinley; Lara Dickey Lewis

(57) ABSTRACT

A freight load carrier for transporting freight load pallets is provided. The freight load carrier has a rectangular carrier base with a longitudinal axis having a top face, bottom face, first and second ends and first and second side rails wherein the top face is configured to receive a freight load pallet thereon. The carrier also includes at least one tailgate hingedly mounted to at least one end of the carrier wherein the tailgate is movable between a freight load pallet blocking position and a freight load carrier releasing position. A method of distributing freight load pallets is also provided.

32 Claims, 7 Drawing Sheets ly<br>
FREIGHT LOAD PALLET CARRIER AND METHOD FOR DISTRIBUTING FREIGHT LOAD PALLETS

BACKGROUND OF THE INVENTION

The present invention relates to freight load pallet carriers and movers and a method of moving a freight load pallet from one location to another. In particular, the present invention relates to a freight load carrier that allows multiple pallets to be moved at one time and that further allows ease in transporting the same.

Pallets are commonly used as a platform to facilitate the handling of stacked items and transportation of goods via truck, rail, air, boat or other transportation method. Individual pallets usually have suitable holes therein to accept the prongs of a fork-lift truck. A pallet can thereby be loaded into and unloaded from trucks, trailers, freight train cars or the like for transport and delivery to a final destination for the particular goods thereon. Each pallet is so moved individually to its desired destination by the operator of a fork-lift truck. This is a time-consuming process. Moreover, once placed onto a truck, trailer, freight train car or the like, the goods stacked on the pallet may shift thereby causing damage to the goods and presenting a hazard to those later unloading the pallet. Accordingly, there is an unsolved need in the state of the art for a freight load pallet carrier and mover that is capable of accepting multiple pallets and securing the goods thereon and provides ease in loading and unloading the pallets.

SUMMARY OF THE INVENTION

The present invention provides an easily transported platform that receives multiple pallets and enables such pallets and the goods thereon to be safely secured to prevent shifting. Moreover, the present invention provides a method for distributing pallets that is both time-saving and safer for those loading and unloading the pallets.

The preferred freight load carrier of the present invention includes a generally rectangular carrier base with a longitudinal axis having a top face, a bottom face, first and second ends and first and second side rails wherein the top face is configured to receive a freight load pallet thereon. The freight load carrier of the present invention further includes at least one tailgate hingably coupled to at least of one said rails and movable between a freight load pallet blocking position and a freight load pallet releasing position.

A preferred method for distributing freight load pallets is also provided. The first step includes stacking at least one freight load pallet onto a freight load carrier. The freight load carrier includes a generally rectangular carrier base with a longitudinal axis having a top face, a bottom face, first and second ends and first and second side rails wherein the top face is configured to receive a freight load pallet thereon. The second step of the preferred method includes providing a freight train car having a plurality of berths. Each berth includes a top wall, bottom wall, first side wall, second side wall and back wall cooperatively defining a freight load carrier receiving cavity. The third step includes loading the freight load carrier into one of the berths.

Another preferred method for distributing freight load pallets includes providing a freight load carrier with at least one tailgate in a load releasing position then aligning the tailgate with the back end of a truck. The next step involves pushing a plurality of freight load pallets onto the carrier from the truck over the tailgate and onto the carrier. Finally, the tailgate is raised into a load blocking position to secure the pallets on the carrier for transport.

DETAILED DESCRIPTION OF THE PREFERRED EMBODIMENT

Figure 1:
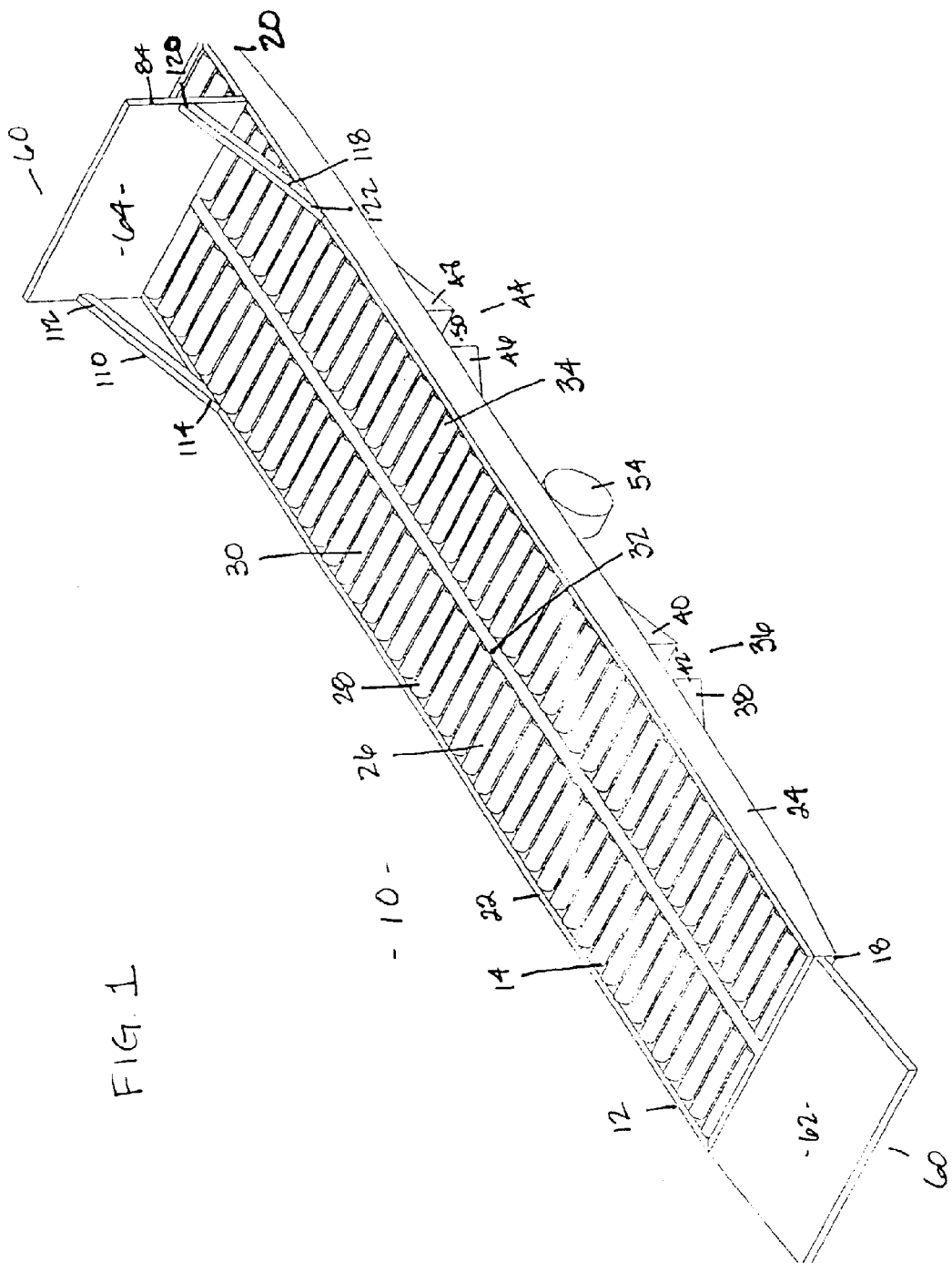
FIG. 1 is a front perspective view of the freight load carrier of the present invention.
Figure 2:
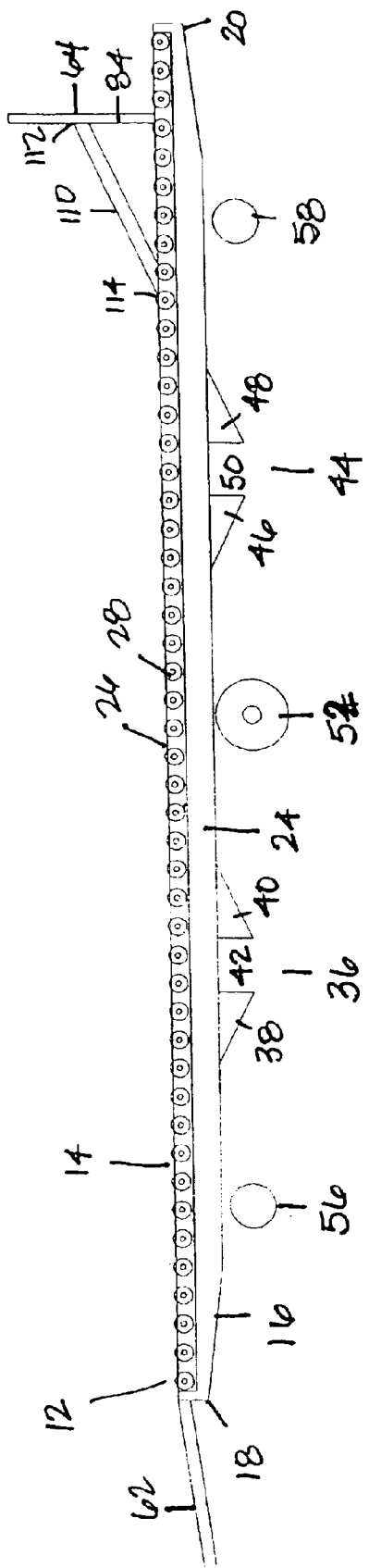
FIG. 2 is a side elevational view of the freight load carrier of the present invention.

The present invention is directed to a freight load carrier and a method for distributing freight load pallets. Referring to FIGS. 1 and 2, the freight load carrier 10 of the present invention comprises a generally rectangular carrier base 12 having a top face 14, a bottom face 16, a first end 18, a second end 20, a first side rail 22 and a second side rail 24. Top face 14 is configured to receive a freight load pallet thereon. In the preferred embodiment, top face 14 comprises a roller assembly 26. Roller assembly 26 includes a plurality of longitudinally-spaced rollers 28 arranged in at least one row 30. Each of the rollers 28 has a generally cylindrical housing rotatably mounted between first side rail 22 and second side rail 24 and are made of metal, plastic, rubber or any material strong enough to bear the weight of a freight load pallet. In another preferred embodiment, carrier base 12 further comprises a center rail 32 extending longitudinally between first end 18 and second end 20 and centrally between first side rail 22 and second side rail 24 such that center rail 32 is spaced laterally from and substantially parallel to first side rail 22 and second side rail 24. A second row 34 of longitudinally-spaced rollers 28 is received within top face 14 and between center rail 32 and second side rail 24. It will be appreciated by those skilled in the art that it is within the scope of the present invention to replace the roller assembly with a conveyor belt, ball bearings, wheels or other devices capable of conveying a freight load pallet.

The preferred freight load carrier hereof further includes a first stabilizing assembly 36 comprising a first stabilizing member 38 and a second stabilizing member 40 affixed to bottom face 16 and extending transversely between first side rail 22 and second side rail 24. First stabilizing member 38 is laterally spaced from and substantially parallel to second stabilizing member 40 and members 38 and 40 cooperate to define a first channel 42. A second stabilizing assembly 44 laterally spaced from and substantially parallel to first stabilizing assembly 36 may also be provided. Second stabilizing assembly 44 includes a third stabilizing member 46 and a fourth stabilizing member 48 which extend transversely between side rails 22 and 24. Third member 46 is laterally spaced from and substantially parallel to fourth member 48 and members 46 and 48 cooperate to define a second channel 50.

The preferred freight load carrier further includes a first wheel 52 rotatably mounted to bottom face 16 of carrier base 12 adjacent first side rail 22 and between stabilizing assemblies 36 and 44. A second wheel 54 is also rotatably mounted to bottom face 16 adjacent second side rail 24 and between stabilizing assemblies 36 and 44. A third wheel 56 rotatably mounted to bottom face 16 may also be provided wherein wheel 56 is adjacent first end 18 and between first end 18 and first stabilizing assembly 36. The preferred carrier 10 may also include a fourth wheel 58 rotatably mounted to bottom face 16 and adjacent second end 20 and between second end 20 and second stabilizing assembly 44. Wheels 52, 54, 56 and 58 provide ease of movement of carrier 10 from one location to another.

The preferred carrier 10 of the present invention further includes a load securing assembly 60 composed of a first tailgate 62 and a second tailgate 64. Tailgates 62 and 64 are generally rectangular and substantially flat. Tailgate 62 is preferably hingably coupled to rails 22 and 24 and movable between an upright load blocking position perpendicular to top face 14 and a load releasing position in the same plane as top face 14. Second tailgate 64 is also hingably coupled to rails 22 and 24 and may also be movable between a load blocking position and load releasing position. FIGS. 1 and 2 show tailgate 62 in a load releasing position and tailgate 64 in a load blocking position. While the preferred tailgates are movable, it is within the scope of this invention for tailgates 62 and 64 to be fixedly coupled with carrier base 12 and fixed in either a load blocking or a load releasing position.

Figure 3:
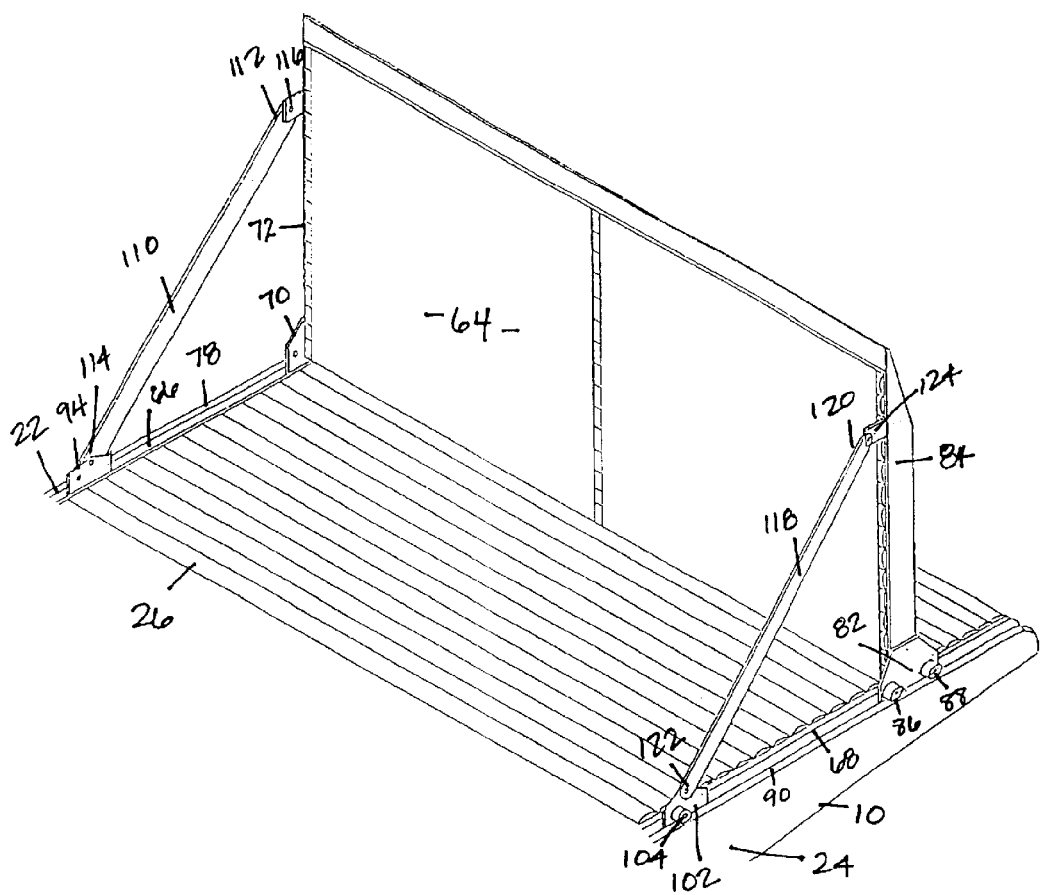
FIG. 3 is a fragmentary front perspective view of the freight load carrier of the present invention.
Figure 4:
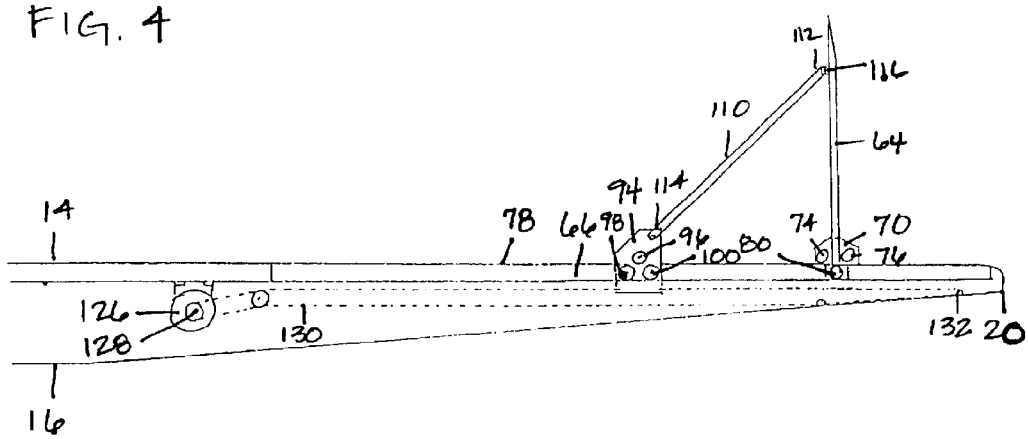
FIG. 4 is a fragmentary side elevational view of the freight load carrier of the present invention.
Figure 5:
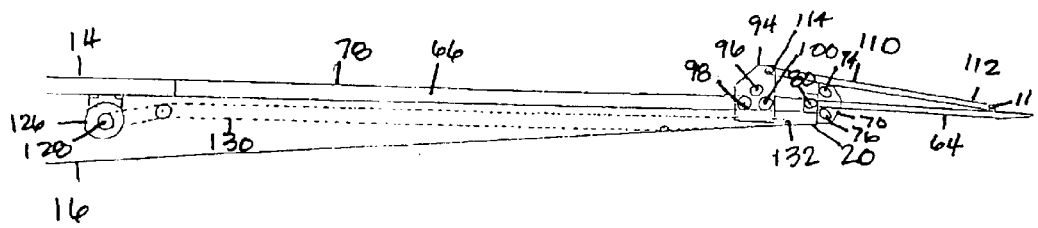
FIG. 5 is a fragmentary side elevational view of the freight load carrier of the present invention.

In the preferred embodiment, as shown in FIG. 3, side rail 22 further includes a first guide channel 66 extending longitudinally therein from first end 18 to second end 20. Side rail 24 includes a second guide channel 68 which extends longitudinally therein from first end 18 to second end 20. As shown in FIGS. 3, 4 and 5 in connection with tailgate 64, a first bracket 70 is affixed to the bottom of left edge 72 of tailgate 64 and extends downwardly into first guide channel 66. A first wheel or cam 74 and a second wheel of cam 76 are rotatably mounted to the outside of bracket 70 and positioned on the top face 78 of first side rail 22 outward from first guide channel 66 in such a way as to allow cams 74 and 76 to movably engage top face 78. A third wheel or cam 80 is rotatably mounted to the bottom of bracket 70 under cams 74 and 76 and within guide channel 66 so that cam 80 may freely roll within guide channel 66. A second bracket 82 is affixed to the bottom of the right edge 84 of tailgate 64 and extends downwardly into second guide channel 68. A fourth wheel or cam 86 and a fifth wheel or cam 88 are rotatably mounted to the outside of bracket 82 and positioned on the top face 90 of second side rail 24 outward from second guide channel 68 in such a way as to allow cams 86 and 88 to movably engage top face 90. A sixth wheel or cam 92 is rotatably mounted to the bottom of bracket 82 under cams 86 and 88 and within guide channel 68 so that cam 92 may freely roll within guide channel 68.

In another preferred embodiment, a first generally flat cam guide 94 is positioned within guide channel 66 inwardly from tailgate 64 and extending upwardly past top face 14. A seventh cam 96 is rotatably mounted to the outside of the top portion of cam guide 94 in such a way as to allow cam 96 to movably engage top face 78 of first side rail 22. Eighth and ninth cams (98, 100) are rotatably mounted to the outside of the bottom portion of cam guide 94 under cam 96 and within guide channel 66 so that cams 98 and 100 may freely roll within guide channel 66. A second cam guide 102 is positioned within guide channel 68 inwardly from tailgate 64 and extends upwardly past top face 14. A tenth cam 104 is rotatably mounted to the outside of the top portion of cam guide 102 in such a way as to allow cam 104 to roll along the top face 90 of second side rail 24. Eleventh and twelfth cams (106, 108) are rotatably mounted to the outside of the bottom portion of cam guide 102 under cam 104 and within guide channel 68 so that cams 106 and 108 may freely roll within guide channel 66.

An elongated first cam follower 110 having a top end 112 and a bottom end 114 is provided wherein top end 112 is pivotally coupled with a first flange 116 which extends outwardly from and perpendicularly to the top portion of left edge 72. Bottom end 114 is pivotally coupled with first cam guide 94. A second cam follower 118 having a top end 120 and a bottom end 122 is pivotally coupled with a second flange 124 which extends outwardly from and perpendicularly to the top portion of right edge 84. Bottom end 122 is pivotally coupled with second cam guide 102. Although not shown in the drawings, it is contemplated by the present invention that first tailgate 62 may also possess a similar cam and cam following assembly as that described herein in connection with tailgate 64.

Turning now to FIGS. 4 and 5, a first motor 126 having an output shaft 128 is affixed to bottom face 16 or underneath roller assembly 26 within carrier 10. Motor 126 may be battery-operated, electric such as a direct current electric gear-head brake motor, or run from an outside power source. Output shaft 128 is operatively connected with a hydraulic system (not shown) or a pulley 130. Pulley 130 is a drive loop of chain, rope, belt or the like, which extends from output shaft 128 through and operatively connected with cam guides 94 and 102 to a pin 132. It will be appreciated that a second motor and pulley assembly may be operatively coupled with the cam and cam following assembly of tailgate 62.

In use, motor 126 is activated and causes pulley 130 to move in a load releasing direction thereby causing cam guides 94 and 102 to move outwardly toward second end 20. The movement of cam guides 94 and 102 causes tailgate 64 to also move outwardly toward second end 20. Once tailgate 64 has reached second end 20, tailgate 64 hingedly moves downward to a load releasing position in a planar relationship with top face 14. At least one freight load pallet 134 is moved onto tailgate 64 and pushed onto roller assembly 26. The direction of motor 126 is reversed and causes pulley 130 to move in a load blocking direction thereby causing cam guides 94 and 102 to move inwardly toward first end 18. The movement of cam guides 94 and 102 causes cam followers 110 and 118 to pull tailgate 64 upwardly until it reaches a load blocking position perpendicular relative to top face 18. Pulley 130 then continues to cause tailgate 64 to move toward pallet 134 until it contacts pallet 134 and moves pallet 134 to a desired location on top face 14. Once the desired location is reached, motor 125 is deactivated and tailgate 64 stops in a load blocking position. It will be appreciated that tailgate 62 may similarly be moved to secure the other side of pallet 134. To assist tailgate 64 in moving pallet 134 along top face 18, it is also within the scope of this invention to provide at least one motor operatively connected to roller assembly 26 thereby causing rollers 28 to move in a desired direction at a constant rate rather than allowing rollers 28 to move freely or under the force of gravity.

Figure 6:
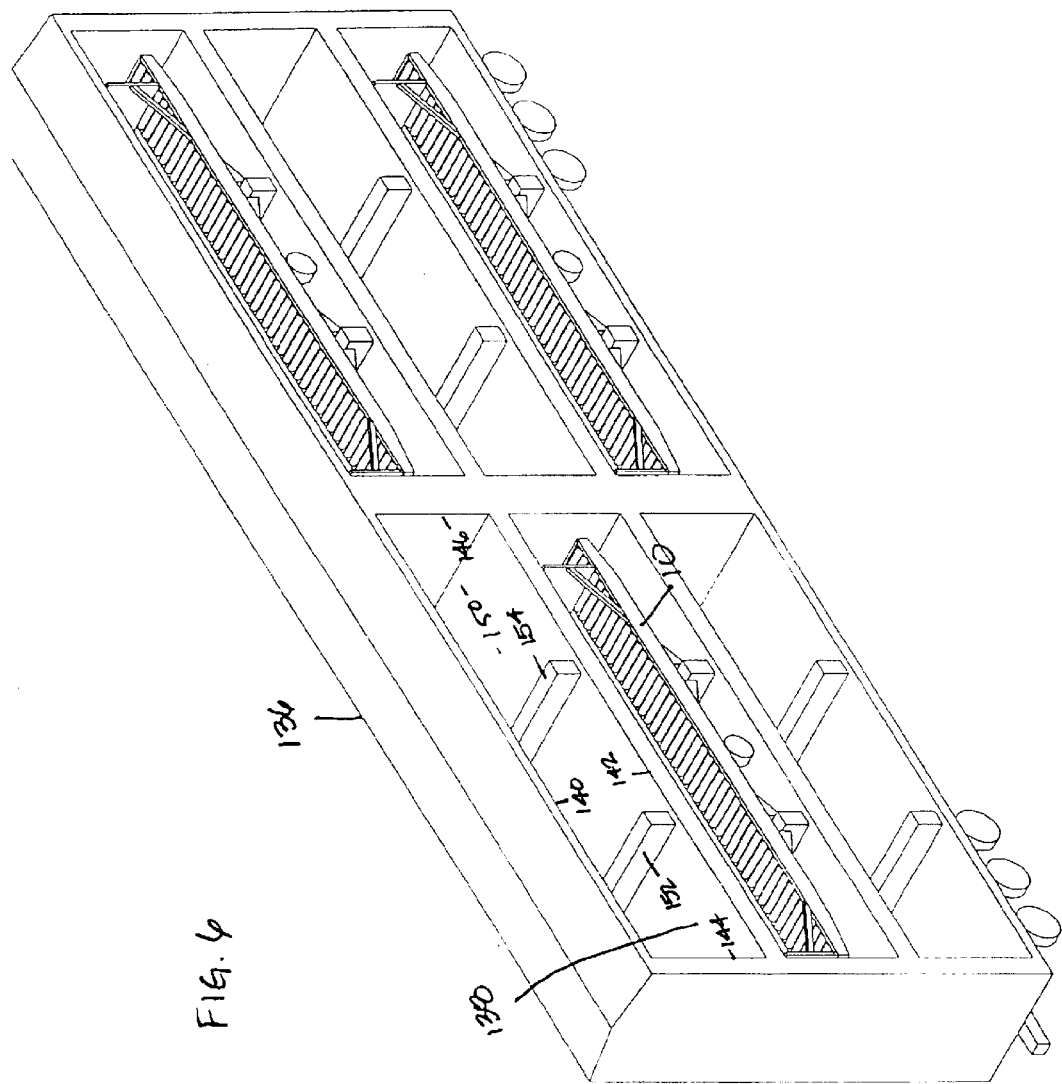
FIG. 6 is a front perspective view of a freight train car showing freight load carriers therein.

Referring now to FIG. 6, the present invention also provides a method for distributing freight load pallets. The preferred method includes stacking at least one freight load pallet onto carrier 10 and providing a freight train car 136. Car 136 comprises at least one berth 138 having a top wall 140, a bottom wall 142, a first side wall 144, a second side wall 146 and a back wall 148. Walls 140, 142, 144, 146 and 148 cooperate to define a freight load carrier receiving cavity 150. The last step of the preferred method includes loading carrier 10 into berth 138.

Another preferred method in accordance with the present invention includes providing at least one berth 138 with a bottom wall 142 having a first stabilizing support member 152 and a second stabilizing support member 154 extending upwardly from and transversely across bottom wall 142 toward back wall 148 with first support member 152 being laterally spaced from and substantially parallel to second support member 154. Carrier 10 is loaded into berth 138 by aligning first channel 42 with first support member 152 and aligning second channel 50 with second support member 154 so that carrier 10 is secured within berth 138.

Figure 7:
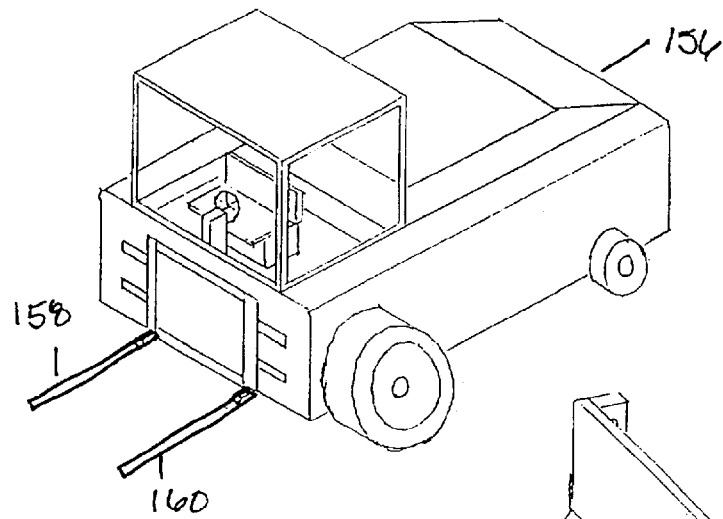
FIG. 7 is an illustration of a freight load mover.

A third preferred method further includes the step of providing a power-operated freight load mover 156 as shown in FIG. 7. Mover 156 may include a first load moving member 158 and a second load moving member 160 which project outwardly from mover 156. First moving member 158 is spaced laterally from and substantially parallel to second moving member 160 and carrier 10 is loaded into berth 138 by inserting first moving member 158 and second moving member 160 into first channel 42 and second channel 50, respectively, until carrier 10 is fully supported by first moving member 158 and second moving member 160 thereby enabling mover 156 to insert carrier 10 into berth 138 by aligning first channel 42 with first support member 152 and aligning second channel 50 with second support member 154 so that carrier 10 is secured within berth 138. An unloading step is also provided by the method of the present invention comprising the step of unloading carrier 10 from car 136 by inserting first moving member 158 and second moving member 160 into first and second channels (42, 50), respectively, above first support member 152 and second support member 154 until carrier 10 is fully supported by first moving member 158 and second moving member 160 thereby enabling mover 156 to reverse while supporting carrier 10 and removing carrier 10 from berth 138.

Figure 8:
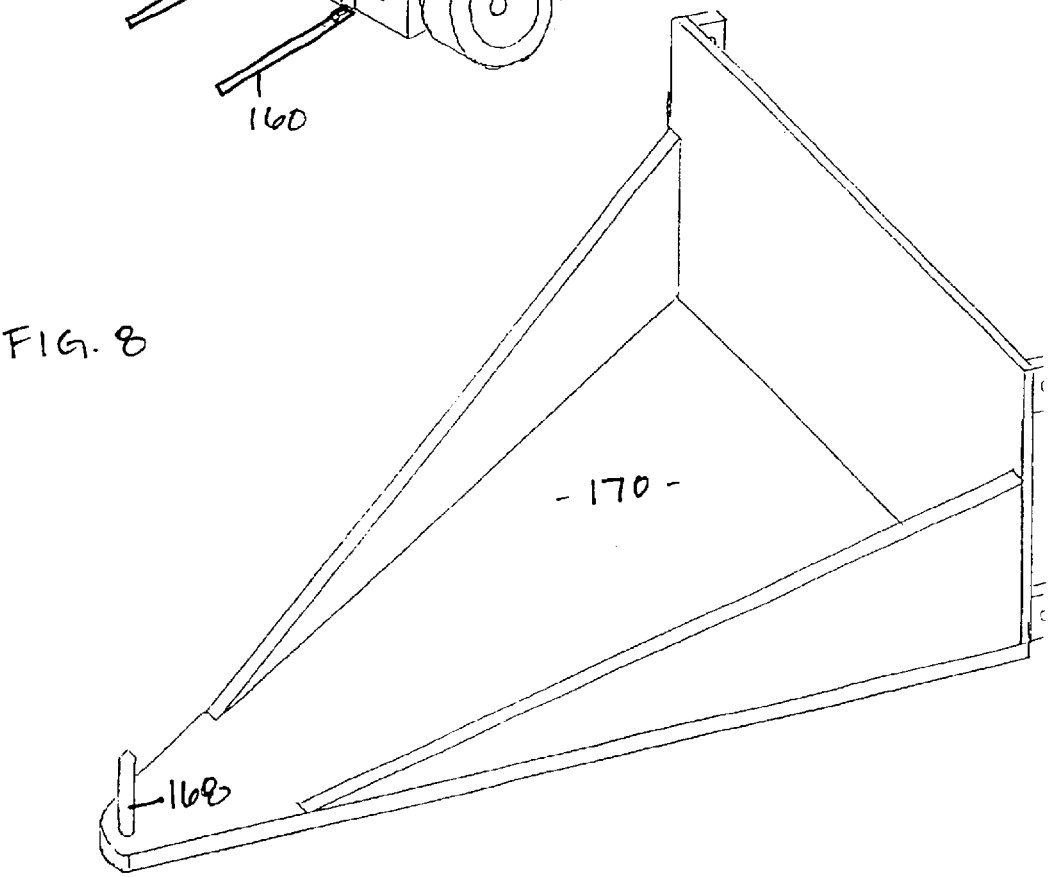
FIG. 8 is front perspective view of a mover assembly.
Figure 9:
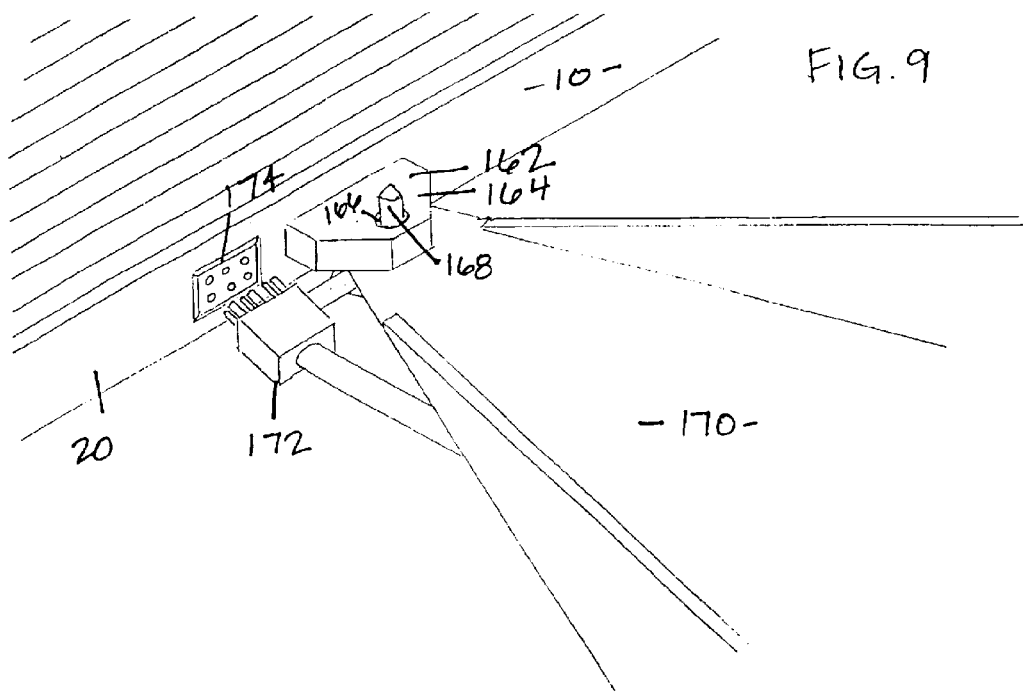
FIG. 9 is an enlarged fragmentary perspective view of a hitch assembly.
Figure 10:
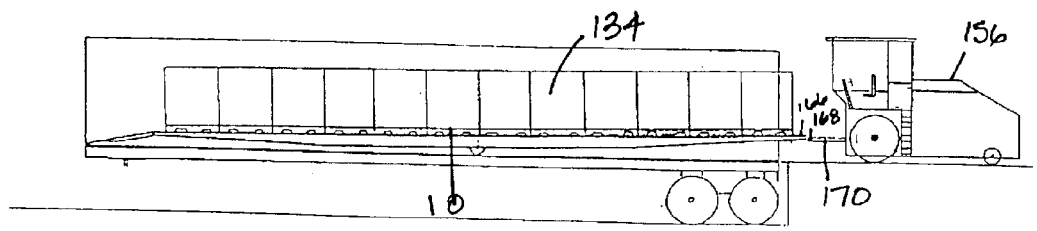
FIG. 10 is a side elevational illustration of a truck with a freight load carrier therein and a freight load mover.

A fourth preferred embodiment of the method of the present invention includes stacking at least one pallet onto carrier 10 and providing carrier 10 with at least one hitch receiving assembly 162 comprising a flange 164 defining an aperture 166 and extending outwardly from at least one of first end 18 and second end 20 as shown in FIG. 9. It will be appreciated that other hitch receiving assemblies known in the art may be used with carrier 10. Mover 156 comprises at least one hitch 168 extending outwardly and configured to be received within hitch receiving assembly 162. As shown in FIG. 8, hitch 168 may be affixed to a mover assembly 170 configured to be coupled with mover 156 and capable of moving in the x, y and z axis. Hitch 168 is inserted into hitch receiving assembly 162 and thereby carrier 10 is transported by mover 156 to and from car 136 or a truck 176 to load or unload pallet 134. Mover 156 may also comprise at least one male electrical connector 172 operatively configured to be received with at least one female electrical connection receiving assembly 174 operatively positioned within at least one of first end 18 and second end 20. In use, power from mover 156 travels through male connector 172 to female assembly 174 on carrier 10 thereby providing electrical current to motor 126 and/or roller assembly 26 as discussed above.

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

We claim:

1. A freight load carrier for receiving at least one freight load pallet thereon comprising:
   a generally rectangular carrier base with a longitudinal axis having a top face, bottom face, first and second ends and first and second side rails wherein said top face is configured to receive a freight load pallet thereon;
   at least one tailgate hingably coupled to at least one of said ends and movable between a freight load pallet blocking position and a freight load pallet releasing position;
   a first stabilizing assembly comprising a first and second stabilizing member affixed to said bottom face and extending transversely between said first side rail and said second side rail, said first member being laterally spaced from and substantially parallel to said second member to cooperatively define a first channel; and
   a second stabilizing assembly laterally spaced from and substantially parallel to said first stabilizing assembly comprising a third and fourth stabilizing member affixed to said bottom face and extending transversely between said first side rail and said second side rail, said third member being laterally spaced from and substantially parallel to said fourth member to cooperatively define a second channel.

2. The carrier of claim 1, said carrier base further comprising a first wheel and second wheel, said first wheel being rotatably mounted to said bottom face adjacent said first side rail and between said first and second stabilizing assemblies, said second wheel being rotatably mounted to said bottom face adjacent said second side rail and between said first and second stabilizing assemblies.

3. The carrier of claim 2, said carrier base further comprising a third wheel and a fourth wheel, said third wheel being rotatably mounted to said bottom face adjacent said first end and between said first end and said first stabilizing assembly, said fourth wheel being rotatably mounted to said bottom face adjacent said second end and between said second end and said second stabilizing assembly.

4. The carrier of claim 1, said carrier base further comprising a second tailgate, said first tailgate being hingably coupled to said first end and movable between a load blocking position and a load releasing position and said second tailgate being hingably coupled to said second end and movable between a load blocking position and a load releasing position.

5. The carrier of claim 4, said first side rail further comprising a first guide channel extending longitudinally therein from said first end to said second end and said second side rail further comprising a second guide channel extending longitudinally therein from said first end to said second end.

6. The carrier of claim 5, said first and second tailgates being movable within said channels.

7. The carrier of claim 6, said first tailgate comprising a left edge having a left top end and a left bottom end and a right edge having a right top end and a right bottom end wherein said left bottom end is coupled with a first cam configured to slidably move within said first channel and said right bottom end is coupled with a second cam configured to slidably move within aid second channel.

8. The carrier of claim 7, said first tailgate further comprising a third cam longitudinally spaced from said first cam and configured to slidably move within said first channel and an elongated first cam follower having a top end pivotally attached to said left top end and a bottom end pivotally attached to said third cam.

9. The carrier of claim 8, said first tailgate further comprising a fourth cam longitudinally spaced from said second cam and configured to slidably move within said second channel and an elongated second cam follower having a top end pivotally attached to said right top end and a bottom end pivotally attached to said fourth cam.

10. The carrier of claim 6, said second tailgate comprising a left edge having a left top end and a left bottom end and a right edge having a right top end and a right bottom end wherein said left bottom end is coupled with a first cam configured to slidably move within said first channel and said right bottom end is coupled with a second cam configured to slidably move within said second channel.

11. The carrier of claim 10, said second tailgate further comprising a third cam longitudinally spaced from said first cam and configured to slidably move within said first channel and a first cam follower having a top end pivotally attached to said left top end and a bottom end pivotally attached to said third cam.

12. The carrier of claim 11, said second tailgate further comprising a fourth cam longitudinally spaced from said second cam and configured to slidably move within said second channel and a second cam follower having a top end pivotally attached to said right top end and a bottom end pivotally attached to said fourth cam.

13. The carrier of claim 6, said carrier base further comprising at least one motor affixed to said bottom face and configured to move said first and second tailgates toward the center of said carrier.

14. The carrier of claim 13, said motor being configured to move said first and second tailgates between a load locking position and a load releasing position.

15. The carrier of claim 3, said carrier further comprising at least one motor affixed to said bottom face and configured to move said roller assembly.

16. A method for distributing freight load pallets comprising the steps of:
 (a) stacking at least one freight load pallet onto a freight load carrier, said freight load carrier comprising a generally rectangular carrier base with a longitudinal axis having a top face, bottom face, first and second ends and first and second side rails
 (b) providing a freight train car, said freight train car comprising at least one berth, said at least one berth comprising a top wall, bottom wall, first side wall, second side wall and back wall cooperatively defining a freight load carrier receiving cavity; and
 (c) loading said freight load carrier into said at least one berths.

17. The method of claim 16 wherein said top face is a roller assembly comprising a row of longitudinally-spaced rollers, each of said rollers having a generally cylindrical housing rotatably mounted between said first and second side rails and configured to support and rotatably convey at least one freight load pallet thereon.

18. The method of claim 16 wherein said carrier further comprises at least one tailgate hingably coupled to at least one of said ends and movable between a freight load pallet blocking position and a freight load pallet releasing position.

19. The method of claim 18 wherein said carrier further comprises a second tailgate hingably coupled to said second end and movable between a load blocking position and a load releasing position.

20. The method of claim 19 further comprising the step of securing said freight load ballets in said berth by moving said tailgates to a load blocking position.

21. The method of claim 16 wherein said carrier further comprises:
 a first stabilizing assembly comprising a first and second stabilizing member affixed to said bottom face and extending transversely between said first side rail and second side rail, said first member being laterally spaced from and substantially parallel to said second member to cooperatively define a first channel; and
 a second stabilizing assembly laterally spaced from and substantially parallel to said first stabilizing assembly comprising a third and fourth stabilizing member affixed to said bottom face and extending transversely between said first side rail and second side rail, said third member being laterally spaced from and substantially parallel to said fourth member to cooperatively define a second channel.

22. The method of claim 21 wherein said bottom wall further comprises a first and second stabilizing support member extending upwardly from and transversely across said bottom wall toward said back wall, said first support member being laterally spaced from and substantially parallel to said second support member.

23. The method of claim 22, said loading step further comprising aligning said first channel with said first support member and aligning said second channel with said second support member so that said carrier is secured within said berth.

24. The method of claim 21 further comprising the step of providing a freight load mover having a first and second load moving member projecting outwardly from said mover, said first moving member spaced laterally and substantially parallel to said second moving member.

25. The method of claim 24 wherein said loading step further comprises loading said freight load carrier into one of said berths by inserting said first and second moving members into said first and second channels, respectively, until said carrier is fully supported by said first and second moving members thereby enabling said mover to insert said carrier into said berth.

26. The method of claim 25 further comprising the step of unloading said carrier from said freight train car by inserting said first and second moving members into said first and second channels, respectively, above said first and second support members until said carrier is fully supported by said first and second moving members thereby enabling said mover to reverse while carrying said carrier.

27. The method of claim 16, said freight load carrier further comprising at least one hitch receiving assembly extending outwardly from at least one of said first and second ends and at least one wheel rotatably mounted to said bottom face.

28. The method of claim 27 further comprising the step of providing a freight load mover having at least one hitch extending outwardly therefrom and configured to be received within said at least one hitch receiving assembly.

29. The method of claim 28 further comprising the step of transporting said carrier to said freight train car by coupling said hitch to said hitch receiving assembly on said mover and pulling said carrier to said car.

30. The method of claim 29, said freight load carrier further comprising at least one female electrical connection receiving assembly positioned within at least one of said first and second ends and said freight load mover further comprising at least one male electrical connector configured to be received within said at least one female electrical connection receiving assembly.

31. The method of claim 30 further comprising the step of electrically coupling said mover to said carrier by inserting said male connector to said female assembly.

32. A method for distributing freight load pallets comprising the steps of:

(a) loading at least one freight load pallet from a freight truck onto a freight load carrier, said freight load carrier comprising a generally rectangular carrier base with a longitudinal axis having a top face, bottom face, first and second ends and first and second side rails;

(b) providing a freight load mover to couple with said carrier wherein said freight load mover transports said carrier to a desired location; and (c) unloading said at least one pallet from said carrier at said desired location.

\* \* \* \* \*